Patented Nov. 6, 1951

2,574,407

UNITED STATES PATENT OFFICE 2,574,407

HIGH MOLECULAR DERIVATIVES OF PIPERAZINE

John David Malkemus, Allendale, and John Ross, Ramsey, N. J., assignors to Colgate-Palmolive-Peet Company, Jersey City, N. J., a corporation of Delaware No Drawing. Application June 23, 1949, Serial No. 100,958

20 Claims. (Cl. 260—268)

This invention relates to a new class of compounds derived from heterocyclic nitrogen compounds of the type represented by piperazine and alkyl-substituted piperazines.

More particularly, the invention relates to a new class of compounds of the foregoing nature that are characterized by the presence in the molecule of (a) a long-chain aliphatic radical of from 6 to 24 carbon atoms, (b) one or more alkoxy groups and (c) the ring structure or nucleus of the heterocyclic nitrogen compound piperazine. Still more particularly, the invention relates to a new class of compounds that are derivatives of piperazine or an alkyl-substituted piperazine, further characterized by the presence of two side-chain substituents at the hetero-nitrogen atoms, one such substituent consisting of a long-chain aliphatic radical of from 6 to 24 carbon atoms, and the other side-chain substituent including at least one alkoxy radical, such as ethoxy, the terminal oxygen atom of which is attached to H or to a short-chain alkyl or short-chain acyl radical, the length of the short chain varying from one to three carbon atoms.

The invention further relates to a new class of compounds having excellent foaming, deterging, wetting and lime-soap-dispersing properties.

The invention also relates to processes for preparing compounds of the foregoing nature.

It is an object of the present invention to provide a new class of compounds having enhanced surface activity for many industrial uses where surface-active compounds are required.

It is a further object of the invention to provide a new class of compounds having surface-active properties characterized in that they are derivatives of a heterocyclic nitrogen compound of the class consisting of piperazine and alkyl-substituted piperazines in which one of the hetero-nitrogen atoms has attached thereto a side-chain consisting of a long-chain ($C_6$ to $C_{24}$) aliphatic radical, and in which compounds the remaining hetero-nitrogen atoms of the piperazine nucleus is attached to a side chain including at least one alkoxy radical, such as ethoxy, the terminal oxygen atom of which is attached to H or to a short-chain acyl radical, the length of the short chain varying from one to three carbon atoms.

The manner in which these and other objects of the invention are achieved will become apparent from the following description.

In accordance with the present invention it has been discovered that a new class of compounds useful as intermediates and as foaming, deterging, wetting and lime-soap-dispersing agents may be obtained by suitable syntheses to be described more fully hereinafter, employing as starting materials (1) a relatively high molecular weight aliphatic halide (R.X) having from 6 to 24 carbon atoms, and preferably having from 12 to 18 carbon atoms, the aliphatic portion being saturated or unsaturated and with or without substituents such as hydroxyl, etc.; (2) a convenient source of an alkoxy radical such as ethylene oxide, and (3) piperazine or an alkyl-substituted piperazine in which the alkyl substituents are preferably of not more than two carbon atoms.

The novel compounds that are obtained in accordance with the present invention in its broadest aspects fall in the class represented by the following general structural formula:

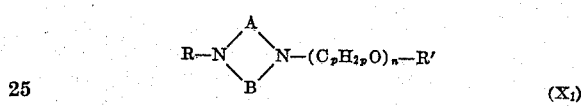

(X₁)

where A and B are selected from the class consisting of unsubstituted ethylene radicals and ethylene radicals having from one to four short-chain alkyl substituents of not more than two carbon atoms each; R is a long-chain alkyl or acyl radical having from 6 to 24 carbon atoms, and preferably from 12 to 18 carbon atoms; R' is selected from the class consisting of H, short-chain alkyl and short-chain acyl radicals, the length of the short chain varying from one to three carbon atoms; $n$ is a small whole number varying from 1 to 20; and $p$ is a small whole number at least 2, and preferably varying from 2 to 4.

A preferred class of novel compounds within the general class set forth above is represented by those compounds containing ethoxy radicals in the side-chain substituent and having no alkyl substituents attached to any of the ring carbon atoms, and corresponding to the following general structural formula:

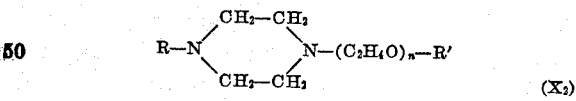

(X₂)

where the various letters have the same meanings as in the immediately preceding formula (X₁).

Before discussing suitable methods of syntheses for the compounds disclosed, it may be well to point out at this stage of the description that the value of $n$ in the preceding formulae is preferably so chosen as to bring about a desired degree of hydrophilic and hydrophobic properties of the resulting molecule, depending upon the intended use for the given compound. In other words, it is readily possible so to adjust the value of $n$ that the resulting compound will show affinities toward both aqueous liquids and oily liquids. Under certain circumstances it may be desirable to produce a specific compound whose affinity for aqueous liquids materially exceeds its affinity for oily liquids, or conversely. For example, certain types of ore flotation processes may require flotation agents or assistants possessing such predetermined properties as regards their respective affinities toward aqueous and oily components, depending for example upon factors such as the nature of the ore undergoing treatment and the particular ingredients thereof being recovered. Also in the treatment of textile materials, such factors as the nature of the textile fibres being treated as well as the presence of other ingredients of the treating composition may render it desirable to produce compounds in accordance with the present invention having desirable surface-active properties, as determined in part by the number of alkoxy radicals present in the side chain. Accordingly, the ability readily to produce compounds of desirable surface-active properties to fit the requirements of any particular use or class of uses is one of the desirable features of the present invention.

In making the long-chain derivatives of piperazine in accordance with the present invention, a wide variety of aliphatic halides may be employed as starting material. For example, suitable halides include those derived from the alcohols corresponding to carboxylic acids including lauric acid, myristic acid, palmitic acid, stearic acid, hydroxystearic acid, oleic acid, ricinoleic acid, lauryl succinic acid, caprylic acid, isocaprylic acid, caproic acid, alphaminocapric acid, undecylenic acid, linoleic acid, linolenic acid, lignoceric acid, erucic acid, chloropalmitic acid, mixed coconut oil fatty acids, mixed tallow fatty acids, mixtures of any of these acids, etc. As halides the chlorides, bromides and iodides of the aliphatic compounds mentioned above may be employed.

The compounds according to the present invention may be prepared as follows, reference being made for the sake of simplicity to the preparation of derivatives of piperazine containing no substituents in the heterocyclic ring other than at the hetero-nitrogen atoms: Piperazine is reacted with one molecular equivalent of ethylene oxide to yield monoethanol piperazine in accordance with the following reaction:

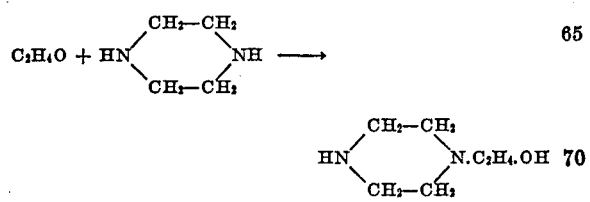

(1)

This compound is then reacted with a long-chain alkyl halide, RX, in accordance with the following reaction:

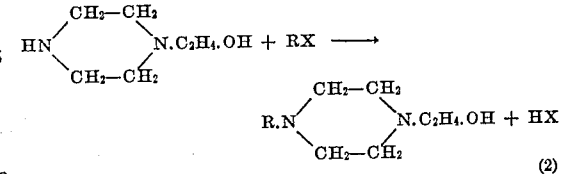

(2)

The N-alkyl-N'-ethanol piperazine is obtained in the form of its hydrohalide salt, which may be converted to the free amine by treating with a slight excess of an alkali such as $Na_2CO_3$, followed by washing to remove the alkali salt and any excess alkali. Where $n$ in the final product is to have a value in excess of one, the free amine is then reacted with a further quantity of ethylene oxide gas at an elevated temperature in order to introduce a plurality of ethoxy radicals into the molecule. The reaction is preferably carried out at an elevated temperature such as the order of approximately 180° C. and, if desired, under superatmospheric pressure, the particular superatmospheric pressure in any given instance being determined principally by factors such as the quantity of ethylene oxide in the system, the course of the reaction, the volume of the reaction system, and the particular temperature at which reaction takes place; superatmospheric pressures autogenously induced in the reaction system are satisfactory. In accordance with the foregoing reaction additional ethoxy radicals are introduced into the molecule as shown by the following reaction:

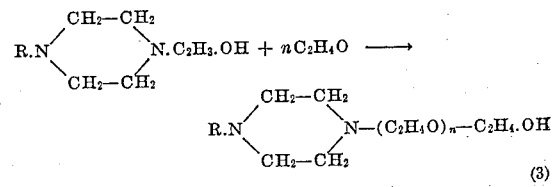

(3)

To obtain the corresponding compounds of the general formula above where R' is a short-chain alkyl group, the reaction product obtained from Reaction 3 having a terminal alcholic OH group is reacted with an alkali metal such as sodium to produce the corresponding sodyl derivative as follows:

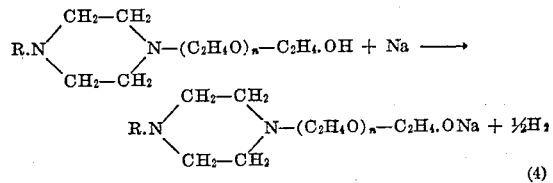

(4)

The reaction product thus obtained is then treated with a short-chain aliphatic halide, R'X, in order to produce the desired ether compound in accordance with the following reaction:

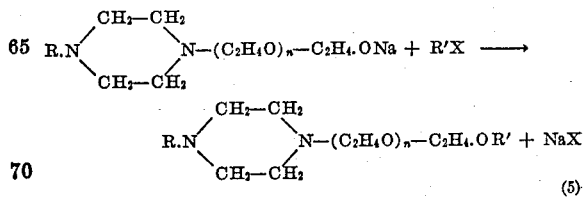

(5)

In cases where it is desired to obtain compounds corresponding to the general formula above in which R' is a short-chain acyl radical of from 1 to 3 carbon atoms, this may be accomplished very readily by reaction with an acid chloride or by esterifying the reaction product obtained from Equation 3 with a short-chain fatty acid, R'.COOH, in order to produce a final ester product as follows:

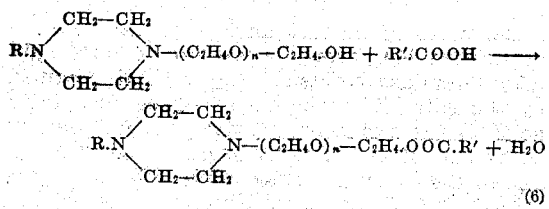

(6)

However, instead of carrying out the esterification by means of a short-chain fatty acid, R'.COOH, as indicated above, one may employ at this point a lower alkyl ester of the desired short-chain fatty acid, R'.COO.alk, in an alcoholysis type reaction in the presence of a small amount (varying from traces up to approximately 2% by weight of the combined reactants) of a caustic alkali such as NaOH, the reaction proceeding as follows:

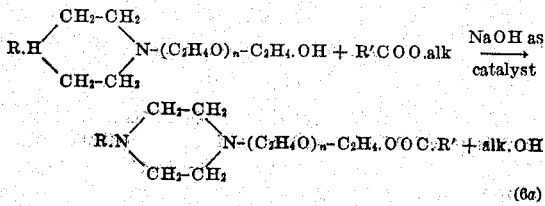

(6a)

To obtain the compounds as represented by the foregoing general structural formula $(X_1)$, where the various letters have the meanings aforementioned, and where R is acyl, this may be accomplished in the manner described in Equations 1 and 2 using a long-chain alkyl carboxylic acid RCOOH (or halide or ester thereof) in place of the long-chain alkyl halide RX. Preferably, however, it is accomplished by condensing piperazine with a fatty acid, fatty acid halide such as fatty acid chloride or a fatty acid ester such as methyl or ethyl laurate, myristate, etc., to form the corresponding mono substituted derivative. After removal of water, hydrohalide or alcohol formed during the reaction and recovery of the mono amide, the same is then reacted with ethylene oxide to form the hydroxy-ethyl substituted compound. Further, where it is desired to obtain the mono-amide compounds in which R' is a short-chain acyl radical of from 1 to 3 carbon atoms, the hydroxyethyl substituted mono-amide may be suitably reacted with a short-chain fatty acid or a lower alkyl ester as indicated in Equations 6 and 6a. The alkyl halide may also be condensed with piperazine and the monoamide reacted with ethylene oxide as described in the preceding paragraph but the preferred procedure is that set forth in Equations 1 and 2.

In general, it is ordinarily preferred to employ substantially stoichiometric ratios of the reactants as indicated by the foregoing equations. However, considerable departure from these ratios can be tolerated in many instances without serious detriment to either yields or quality of product. In connection with the reaction illustrated above as Reaction 1, however, if one resorts to the use of other than substantially stoichiometric ratios of reactants it is ordinarily preferred to modify this ratio in the direction of providing an excess of piperazine, thereby decreasing the yield of undesired by-products such as diethanol piperazine. Similarly when conducting the reactions indicated above by Equations 2, 4, 5, 6 and 6a, it is preferred to depart if at all from the use of substantially stoichiometric ratios of reactants in the direction of insuring the presence of an excess of the piperazine derivative in the reaction system.

The long-chain aliphatic piperazine derivatives prepared according to the present invention possess very desirable surface-active properties. They are excellent detergents and are also valuable as wetting, foaming and lime-soap dispersing agents. Under certain circumstances they may be in fact superior to conventional fatty acid soaps for use as detergents. They may be used either alone or in combination with other surface-active materials, such as soaps and/or other synthetic surface-active compounds of the type of sulphated and/or sulphonated organic compounds, in view of the fact that they are in general fairly compatible therewith.

The novel compounds described herein exhibit desirable surface-active properties in both acid and alkaline media, although they appear to change in character from a cationic active form to a non-ionized form, depending upon the pH of the environment in which they are employed.

The novel compounds contemplated as falling within the scope of the present invention may be made up in dilute or concentrated aqueous solution, with or without the presence of a substantial content of a low molecular weight alcohol such as ethyl alcohol, or they may be made into a dry or partially hydrated solid product, depending upon economical or other considerations. Adjuvant materials may be admixed with these compounds to form flakes, granular particles, cakes, pastes or other physical forms of the mixture, or such adjuvant materials may be added to aqueous or other solutions of the compound. Such adjuvant materials may include sodium chloride, sodium sulphate, sodium pyrophosphate, as well as other builders and/or fillers employed in the soap and synthetic detergent arts generally, care being taken to avoid the use of any additives which would substantially diminish the effectiveness of the resulting composition. Those skilled in the art will of course appreciate that the type of addition agent to be employed depends at least in part upon the ultimate use to which the product is to be put.

The properties of the specific compounds of the present invention vary to some degree, depending upon the particular starting materials from which they are prepared, but all are surface-active agents having valuable wetting, deterging, emulsifying, softening, foaming and lime-soap-dispersing properties. They are suitable for use as assistants in the textile and related industries where they may be employed for softening fabrics, fixing colors, removing grease and oil, penetrating, etc. They are also of use in the ore flotation art as addition agents to the ore treating baths employed for separating various constituents of ores. They are also of value in the cosmetic industry as emulsifying agents and for stabilizing emulsions.

In order to indicate even more fully the nature of the present invention, the following examples of typical procedure are set forth, it being understood that these examples are presented as illustrative only and that they are not intended to limit the scope of the invention. The parts given are parts by weight unless otherwise indicated.

*Example I*

A solution of piperazine and alcohol is prepared containing 344 parts of piperazine in 500 parts of methyl alcohol. Ethylene oxide gas is passed into the mixture at 80° C. until 44 parts have been absorbed. The resulting reaction mixture is then subjected to distillation under reduced pressure and in an inert atmosphere, such as nitrogen, in order to effect a separation between the desired monoethanol piperazine, which is obtained in about a 75% yield, on the one hand and unreacted piperazine and the diethanol derivative thereof on the other hand. 130 parts of the monoethanol piperazine, b. 125–127°/12 mm., $n_D^{25}$ 1.5052, $d_4^{20}$ 1.0595, is then admixed with 330 parts of octadecyl bromide in ethyl alcohol solution, the mixture being finally heated for a short time under a reflux condenser at a temperature of about 75° C. to 100° C. to complete the reaction, thereby resulting in substitution of the octadecyl radical for the hydrogen atom at the second hetero-nitrogen atom. In this manner there is obtained N-octadecyl-N'-β-hydroxyethyl-piperazine in the form of its hydrobromide salt, which may be converted to the free tertiary amine, a viscous orange oil, by treating with a slight excess of alkaline material such as Na₂CO₃ followed by washing with water to remove the sodium bromide and any excess alkali. This product, or its hydrobromide, dissolves readily in dilute aqueous hydrochloric acid wherein it behaves as a cationic surface active agent, said solutions possessing good foaming, wetting and emulsifying properties.

*Example II*

380 parts of the free amine of Example I is reacted with ethylene oxide gas at an elevated temperature of the order of about 180° C. and under autogenous pressure and in the presence of a trace of alkali, the reaction being stopped when 88 parts by weight of ethylene oxide have reacted. The resulting brown viscous oil is principally N-octadecyl-N'-hydroxyethyloxyethoxy-ethylpiperazine corresponding to the formula:

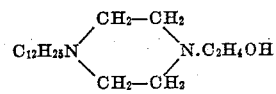

One portion of the end product just mentioned is reacted with one gram atom equivalent of metallic sodium, followed by reaction with one molecular equivalent of ethyl iodide. Another portion of the end product just mentioned is reacted with one molecular equivalent of acetyl chloride. The respective final products are N-octadecyl-N'-ethyltri-ethoxypiperazine and N-octadecyl-N'-acetoxytri-ethoxypiperazine. These materials function best in acid solution—as cationic surface active agents—said solutions exhibiting excellent foaming, wetting, emulsifying, and detergent properties.

*Example III*

38 parts of the free amine of Example I is reacted with ethylene oxide under the same conditions of Example II until 44 parts by weight have been absorbed. The resulting light brown oil contains an average of ten ethoxy groups per molecule corresponding to the formula:

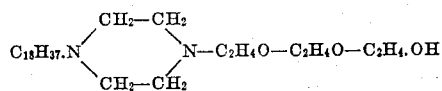

N-octadecyl-N'-hydroxyethyloxy-octa-ethoxy-ethylpiperazine

Two parts of this material are dissolved in 198 parts of water to give a 1% aqueous dispersion which exhibits good foaming, wetting, emulsifying, and detergent properties in alkaline as well as in acid solution.

*Example IV*

130 parts of monoethanol piperazine are reacted with 240 parts of a mixture of long-chain alkyl bromides corresponding to that obtained by the catalytic reduction of mixed coco fatty acids to the corresponding alcohols, followed by conversion of the latter to the corresponding bromides, the formula of the mixture being represented by C₁₂H₂₅Br (lauryl bromide) as regards the average composition thereof. The reaction is carried out in ethyl alcohol solution, the alkyl halide being added gradually to the amine followed by refluxing the mixture for several hours after which the free amine is recovered by extraction from alkaline solution. This results in the production of the coco fatty alkyl (lauryl) substituted monoethanolpiperazine which is obtained as an orange viscous oil and is represented by the formula:

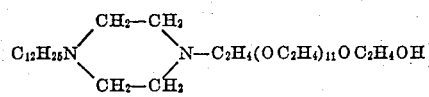

While the hydrobromide or hydrochloride salt is fairly soluble in water and the resulting solutions exhibit considerable surface activity as demonstrated by their foaming and wetting properties, the free amine is only slightly soluble in water and possesses only slight foaming properties in alkaline solution.

*Example V*

60 parts of the free amine of Example IV is heated to 180° C. in the presence of a trace of alkali after the air in the reaction chamber has been displaced by nitrogen. Then ethylene oxide gas is passed into the liquid until about 106 parts by weight have been absorbed, corresponding to an average introduction of an additional twelve ethoxy groups per molecule. The resulting yellow oil may be represented by the formula:

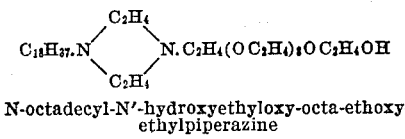

This material is readily soluble in alkaline or in acid solution and exhibits useful foaming, wetting, emulsifying and detergent properties over a wide pH range.

*Example VI*

A mixture of 200 parts of mixed coconut oil fatty acids and 420 parts of piperazine is heated with stirring under nitrogen while gradually raising the temperature to a maximum of about 180° C. After about three hours at this temperature the pressure is gradually reduced to about 50 mm. Hg abs. to facilitate the removal of the water formed during the reaction and thereby drive the reaction to completion. The crude reaction product, containing the desired mono substituted derivative plus unreacted piperazine and the undesirable disubstituted product, is partitioned between water and ether to wash out the water-soluble piperazine. The ether extract is then washed with dilute hydrochloric acid in order to extract the amino amide; the diamide remains in the ether. The aqueous acid extract is then made alkaline with dilute caustic and the freed amine (the amino amide) is extracted with fresh ether.

After removing the solvent by distillation, the desired mono amide remains as an orange paste whose composition is represented by the following formula:

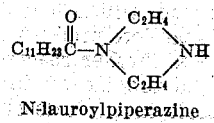

N-lauroylpiperazine

A mixture of 266 parts of the N-lauroylpiperazine and 1000 parts of methyl alcohol is heated on the steam bath under a reflux condenser while ethylene oxide gas is passed into the mixture until 44 parts have been absorbed. After distilling the solvent, finally under diminished pressure, the N-ethanol derivative is left as a light brown residue whose composition may be represented by the following formula:

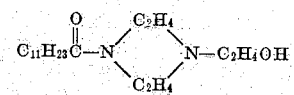

N-lauroyl-N'-beta-hydroxyethylpiperazine

This material is only slightly soluble in water although it dissolves readily in dilute acid and the resulting solutions are found to possess excellent foaming, wetting, and emulsifying properties.

*Example VII*

31 parts of the N-lauroyl-N'-beta-hydroxyethylpiperazine obtained in Example VI are heated under nitrogen, to about 180° C. and, after adding a trace of alkali, ethylene oxide gas is introduced under the surface of the liquid until 44 parts have been absorbed. The resulting brown oil contains an average of about eleven ethoxy groups per molecule and is represented by the following formula:

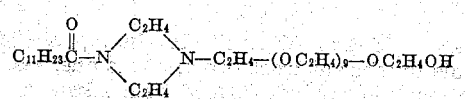

This product is quite soluble in neutral or alkaline solution as well as in acid solution and exhibits excellent foaming and detergent properties over a wide pH range.

While various specific examples of preferred compositions and methods embodying the present invention have been described above, it will be apparent that many changes and modifications may be made in the methods of procedure and that a wide variety of specific reagents may be employed in carrying out the procedure. It should therefore be understood that the examples cited and the particular proportions, methods of procedure and compounds set forth above are intended to be illustrative only and are not intended to limit the scope of the invention.

What is claimed is:

1. A piperazine derivative having the following structural formula:

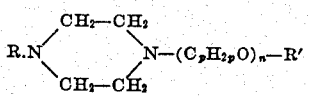

where R is selected from the class consisting of long-chain alkyl and acyl radicals having from 6 to 24 carbon atoms; R' is selected from the class consisting of H, short-chain alkyl and short-chain acyl radicals; $n$ is a whole number varying from 1 to 20; and $p$ is a small whole number varying from 2 to 4.

2. A piperazine derivative having the following structural formula:

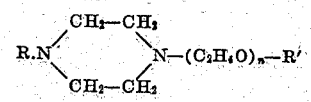

where R is selected from the class consisting of long-chain alkyl and acyl radicals having from 6 to 24 carbon atoms; R' is selected from the class consisting of H, short-chain alkyl and short-chain acyl radicals; and $n$ is a whole number varying from 1 to 20.

3. A piperazine derivative having the following structural formula:

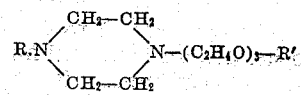

where R is selected from the class consisting of long-chain alkyl and acyl radicals having from 6 to 24 carbon atoms; and R' is selected from the class consisting of H, short-chain alkyl and short-chain acyl radicals.

4. A compound having the piperazine nucleus and two side-chain substituents attached to the hetero-nitrogen atoms thereof as set forth in claim 2 in which R has 18 carbon atoms.

5. A compound having the piperazine nucleus and two side-chain substituents attached to the hetero-nitrogen atoms thereof as set forth in claim 2 in which R has 16 carbon atoms.

6. A compound having the piperazine nucleus and two side-chain substituents attached to the hetero-nitrogen atoms thereof, one side-chain substituent being selected from the class consisting of alkyl and acyl radicals corresponding in carbon atom content to the average carbon atom content of the alcohols derived from coconut fatty acids, and the other side-chain substituent consisting of from 1 to 20 ethoxy radicals the terminal oxygen atom of which is linked to a radical selected from the class consisting of H, and alkyl and acyl radicals of from 1 to 3 carbon atoms.

7. A process for preparing surface-active compounds which comprises reacting a piperazine derivative having the following structural formula:

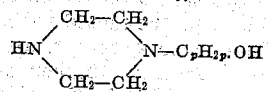

where $p$ is a small whole number varying from 2 to 4, with an alkyl halide having from 6 to 24 carbon atoms, and recovering the resulting high molecular weight amine.

8. A process for preparing surface-active compounds which comprises reacting monoethanol piperazine with an alkyl halide having from 6 to 24 carbon atoms, and recovering the resulting high molecular weight amine.

9. A process for preparing surface-active compounds which comprises reacting piperazine with a fatty acid having from 6 to 24 carbon atoms, recovering the resulting high molecular weight mono amide, and reacting said mono amide with ethylene oxide to form a hydroxyethyl derivative.

10. A process in which the high molecular weight amine reaction product obtained as recited in claim 7 is further reacted with an alkylene oxide having from 2 to 4 carbon atoms in order to provide an increased number of the corresponding alkoxy radicals in the side-chain substituent having the terminal alcoholic OH group.

11. A process in which the high molecular weight amine reaction product obtained as recited in claim 8 is further reacted with ethylene oxide in order to provide an increased number of ethoxy radicals in the side-chain substituent having the terminal alcoholic OH group.

12. A process in which the high molecular weight amide reaction product obtained as recited in claim 9 is further reacted with ethylene oxide in order to provide an increased number of ethoxy radicals in the side-chain substituent having the terminal alcoholic OH group.

13. A process in which the high molecular weight amine reaction product obtained as recited in claim 7 is further reacted with an alkylene oxide having from 2 to 4 carbon atoms in order to provide an increased number of the corresponding alkoxy radicals in the side-chain substituent having the terminal alcoholic OH group, and thereafter reacting the resulting compound with a member of the class consisting of carboxylic acids and their lower alkyl esters, wherein the carboxylic acid radical has from 1 to 3 carbon atoms.

14. A process in which the high molecular weight amine reaction product obtained as recited in claim 8 is further reacted with ethylene oxide in order to provide an increased number of ethoxy radicals in the side-chain substituent having the terminal alcoholic OH group, and thereafter reacting the resulting compound with a member of the class consisting of carboxylic acids and their lower alkyl esters, wherein the carboxylic acid radical has from 1 to 3 carbon atoms.

15. A process in which the high molecular weight amide reaction product obtained as recited in claim 9 is further reacted with ethylene oxide in order to provide an increased number of ethoxy radicals in the side-chain substituent having the terminal alcoholic OH group, and thereafter reacting the resulting compound with a member of the class consisting of carboxylic acids and their lower alkyl esters, wherein the carboxylic acid radical has from 1 to 3 carbon atoms.

16. A process in which the high molecular weight amine reaction product obtained as recited in claim 7 is further reacted with alkylene oxide having from 2 to 4 carbon atoms in order to provide an increased number of the corresponding alkoxy radicals in the side-chain substituent having the terminal alcoholic OH group, and thereafter reacting the resulting compound with a free alkali metal to form an alkoxide, and then with an alkyl halide having from 1 to 3 carbon atoms.

17. A process in which the high molecular weight amine reaction product obtained as recited in claim 8 is further reacted with ethylene oxide in order to provide an increased number of ethoxy radicals in the side-chain substituent having the terminal alcoholic OH group, and thereafter reacting the resulting compound with a free alkali metal to form an alkoxide, and then with an alkyl halide having from 1 to 3 carbon atoms.

18. A process in which the high molecular weight amide reaction product obtained as recited in claim 9 is further reacted with ethylene oxide in order to provide an increased number of ethoxy radicals in the side-chain substituent having the terminal alcoholic OH group, and thereafter reacting the resulting compound with a free alkali metal to form an alkoxide, and then with an alkyl halide having from 1 to 3 carbon atoms.

19. A process for preparing surface-active compounds which comprises reacting piperazine with coconut oil fatty acids to form a mono amide piperazine derivative, and reacting said amide piperazine derivative with ethylene oxide to form a hydroxyethyl piperazine derivative.

20. A process for preparing surface-active compounds which comprises reacting a member of the class consisting of long-chain alkyl halides, carboxylic acids, carboxylic acid halides and carboxylic acid esters of short-chain monohydric alcohols with a compound having the structural formula

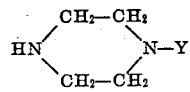

where Y is H or $(C_pH_{2p}O)_nH$ where $p$ is a small whole number at least two and $n$ is one, reacting the reaction product formed with alkylene oxide to produce a derivative thereof, reacting said derivative with an alkali metal to form an alkoxide, and reacting the resulting alkoxide with an alkyl halide having from 1 to 3 carbon atoms.

JOHN DAVID MALKEMUS.
JOHN ROSS.

No references cited.